(12) United States Patent
Mollick et al.

(10) Patent No.: US 7,677,652 B2
(45) Date of Patent: Mar. 16, 2010

(54) ROOF INNER BODY STRUCTURE

(75) Inventors: Matthew Mollick, Novi, MI (US); Mark Snyder, Beverly Hills, MI (US); Hirofumi Eta, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 862 days.

(21) Appl. No.: 11/391,887

(22) Filed: Mar. 29, 2006

(65) Prior Publication Data

US 2007/0228777 A1    Oct. 4, 2007

(51) Int. Cl.
    *B62D 25/06* (2006.01)
(52) U.S. Cl. .............. 296/210; 296/193.12; 296/203.03
(58) Field of Classification Search ................. 296/210, 296/187.13, 193.12, 191, 102, 215, 203.03
    See application file for complete search history.

(56) References Cited

U.S. PATENT DOCUMENTS

| | | | |
|---|---|---|---|
| 3,247,068 A * | 4/1966 | Schluderberg et al. ...... | 376/177 |
| 4,601,511 A * | 7/1986 | Nakamura et al. .......... | 296/210 |
| 4,666,206 A * | 5/1987 | Hough ................... | 296/216.07 |
| 5,052,743 A * | 10/1991 | Inada et al. ................. | 296/210 |
| 5,318,338 A * | 6/1994 | Ikeda .......................... | 296/210 |
| 5,681,076 A * | 10/1997 | Yoshii ......................... | 296/210 |
| 5,795,014 A * | 8/1998 | Balgaard ..................... | 296/210 |
| 6,027,160 A * | 2/2000 | Brodt et al. .................. | 296/210 |
| 6,168,231 B1 * | 1/2001 | Fielding et al. ............. | 296/210 |
| 6,254,174 B1 * | 7/2001 | Wee .......................... | 296/203.04 |
| 6,282,790 B1 * | 9/2001 | Jaekel et al. ................ | 29/897.2 |
| 6,322,135 B1 * | 11/2001 | Okana et al. ............ | 296/203.03 |
| 6,367,872 B1 | 4/2002 | Bohm et al. | |
| 6,513,864 B2 | 2/2003 | Bohm et al. | |
| 6,543,841 B1 | 4/2003 | Ohkubo | |
| 6,550,851 B2 | 4/2003 | Seifert | |
| 6,575,521 B2 * | 6/2003 | Tarahomi ..................... | 296/103 |
| 6,786,538 B1 * | 9/2004 | Turk et al. ............. | 296/216.01 |
| 6,825,442 B2 * | 11/2004 | Schroth et al. ...... | 219/137 WM |
| 6,942,288 B2 | 9/2005 | Paetz et al. | |
| 6,971,704 B2 | 12/2005 | Cocaign | |
| 7,055,882 B2 * | 6/2006 | Santaolalla Gil et al. ... | 296/37.7 |
| 7,159,931 B2 * | 1/2007 | Chernoff et al. ........ | 296/187.01 |
| 7,201,435 B2 * | 4/2007 | Losch ......................... | 296/210 |
| 7,213,874 B2 * | 5/2007 | Osterberg et al. ........... | 296/210 |
| 7,234,766 B2 * | 6/2007 | Uchida et al. ............... | 296/210 |
| 7,296,850 B2 * | 11/2007 | Kaneda et al. .............. | 296/210 |

(Continued)

FOREIGN PATENT DOCUMENTS

EP    1 310 394 A1    5/2003

(Continued)

*Primary Examiner*—Glenn Dayoan
*Assistant Examiner*—Gregory Blankenship
(74) *Attorney, Agent, or Firm*—Young Basile

(57) ABSTRACT

A roof structure for a vehicle can include a tailor-welded-blank, inner roof frame. The inner roof frame can include, at least in part, an elongated, transversely extending, intermediate roof rail having a first material thickness, and a plurality of reinforced roof rails. Each of the reinforced roof rails can extend away from the intermediate roof rail in a common direction toward a remote end of the inner roof frame. Each of the reinforced roof rails can have a different material thickness than the first material thickness of the intermediate roof rail.

25 Claims, 3 Drawing Sheets

U.S. PATENT DOCUMENTS

| | | | |
|---|---|---|---|
| 7,543,884 B2 * | 6/2009 | Reed et al. | 296/210 |
| 2005/0189787 A1 * | 9/2005 | Chernoff et al. | 296/187.01 |
| 2005/0269839 A1 * | 12/2005 | Losch | 296/210 |
| 2006/0232107 A1 * | 10/2006 | Wieschermann et al. | 296/211 |
| 2007/0158978 A1 * | 7/2007 | Woodhouse et al. | 296/210 |
| 2007/0228777 A1 * | 10/2007 | Mollick et al. | 296/210 |
| 2008/0231086 A1 * | 9/2008 | Mathes et al. | 296/210 |

FOREIGN PATENT DOCUMENTS

| | | | |
|---|---|---|---|
| JP | 61188220 A | * | 8/1986 |

* cited by examiner

ROOF INNER BODY STRUCTURE

FIELD OF THE INVENTION

The invention relates to a roof structure for a vehicle including an inner roof frame having, at least in part, an elongated transversely extending intermediate roof rail, and a plurality of reinforced roof rails, each of the reinforced roof rails extending away from the intermediate roof rail in a common direction toward a remote end of the inner roof frame.

BACKGROUND

Various roof structure configurations can be seen in U.S. Pat. Nos. 6,971,704; 6,942,288; 6,550,851; 6,543,841; 6,513,864; 6,367,872; and EP Published Application No. EP1 310394 A1. While these various configurations appear suitable for their intended purpose, it would be desirable to provide an integrated roof inner body structure with optimized cost and weight. It would be desirable to provide a roof inner body structure made up of components that serve different functions and allow for optimized cost and weight due to different material thicknesses and/or material properties. It would be desirable to provide a reinforced roof inner body structure that can be made from one stamping rather than three separate stampings. It would be desirable to provide a roof inner body structure with four main structural components to provide proper roof support for roof materials through which light rays can pass. It would be desirable to provide a center or intermediate cross member to transfer load during side impact and to serve as a vertical load bearing beam to help support a forward sunroof unit. It would be desirable to provide a center or intermediate cross member that can also be used as a rigid member to mount video display screens to eliminate shake. It would be desirable to provide beam members extending between a center or intermediate cross member and a rear rail to support vertical loads of panels at least partially formed of material through which light rays can pass. It would be desirable for the beam members to serve the same purpose as a roof bow in order to provide panel stiffness. It would be desirable to provide a tailor-welded-blank inner roof structure in order to allow material thickness and material grade of each of the structural members to be individually selected and varied with respect to one another to provide optimum strength while using the least amount of material necessary for specific points on the vehicle. It would be desirable to provide any of the features described above in any combination.

SUMMARY

A roof structure for a vehicle according to one embodiment of the present invention can include a tailor-welded-blank, inner roof frame. The inner roof frame can include, at least in part, an elongated transversely extending intermediate roof rail having a first material thickness, and a plurality of reinforced roof rails. Each of the reinforced roof rails can extend away from the intermediate roof rail in a common direction toward a remote end of the inner roof frame, and can have a different material thickness than the intermediate roof rail.

A roof structure according to one embodiment of the present invention for the roof of a vehicle can extend transversely between two lateral outer roof elements and can extend in a lengthwise direction between a front roof element and a rear roof element. The roof structure can include a tailor-welded-blank, inner roof frame connectible between the lateral roof elements and connectible to the rear roof element. The inner roof frame can include, at least in part, an elongated transversely extending intermediate roof rail located between the front roof element and the rear roof element having a first material thickness, and a plurality of reinforced roof rails. Each of the reinforced roof rails can be connected to the intermediate roof rail and can extend away from the intermediate roof rail in a common direction toward the rear roof element. Each of the reinforced roof rails can have a different material thickness than the intermediate roof rail.

A roof structure for the roof of a vehicle can extend transversely between two lateral outer roof elements and can extend in a lengthwise direction between a front roof element and a rear roof element. The roof structure can include a tailor-welded-blank, inner roof frame connectible between the lateral roof elements and connectible to the rear roof element. The inner roof frame can include, at least in part, an elongated transversely extending intermediate roof rail located between the front roof element and the rear roof element, and a plurality of reinforced roof rails. The intermediate roof rail can have a first material thickness. Each of the reinforced roof rails can be connected to the intermediate roof rail and can extend away from the intermediate roof rail in a common direction toward the rear roof element. Each of the reinforced roof rails can have a different material thickness than the intermediate roof rail. Each remote end of the plurality of reinforced roof rails can be connected to the rear roof element. The plurality of reinforced roof rails can include a reinforced right hand roof rail connected to the intermediate roof rail, a reinforced left hand roof rail connected to the intermediate roof rail at a location spaced from the right hand roof rail, and a reinforced center roof rail connected to the intermediate roof rail at a location in between the right hand roof rail and the left hand roof rail. Each of the reinforced roof rails can have a transverse cross section defined by a base, two outwardly angled sides extending from opposite transverse edges of the base, and a flange extending from an outer end of each side. An outer vehicle skin can be connected to the inner roof frame. The outer vehicle skin can be formed, at least in part, of a material permitting light rays to pass through.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
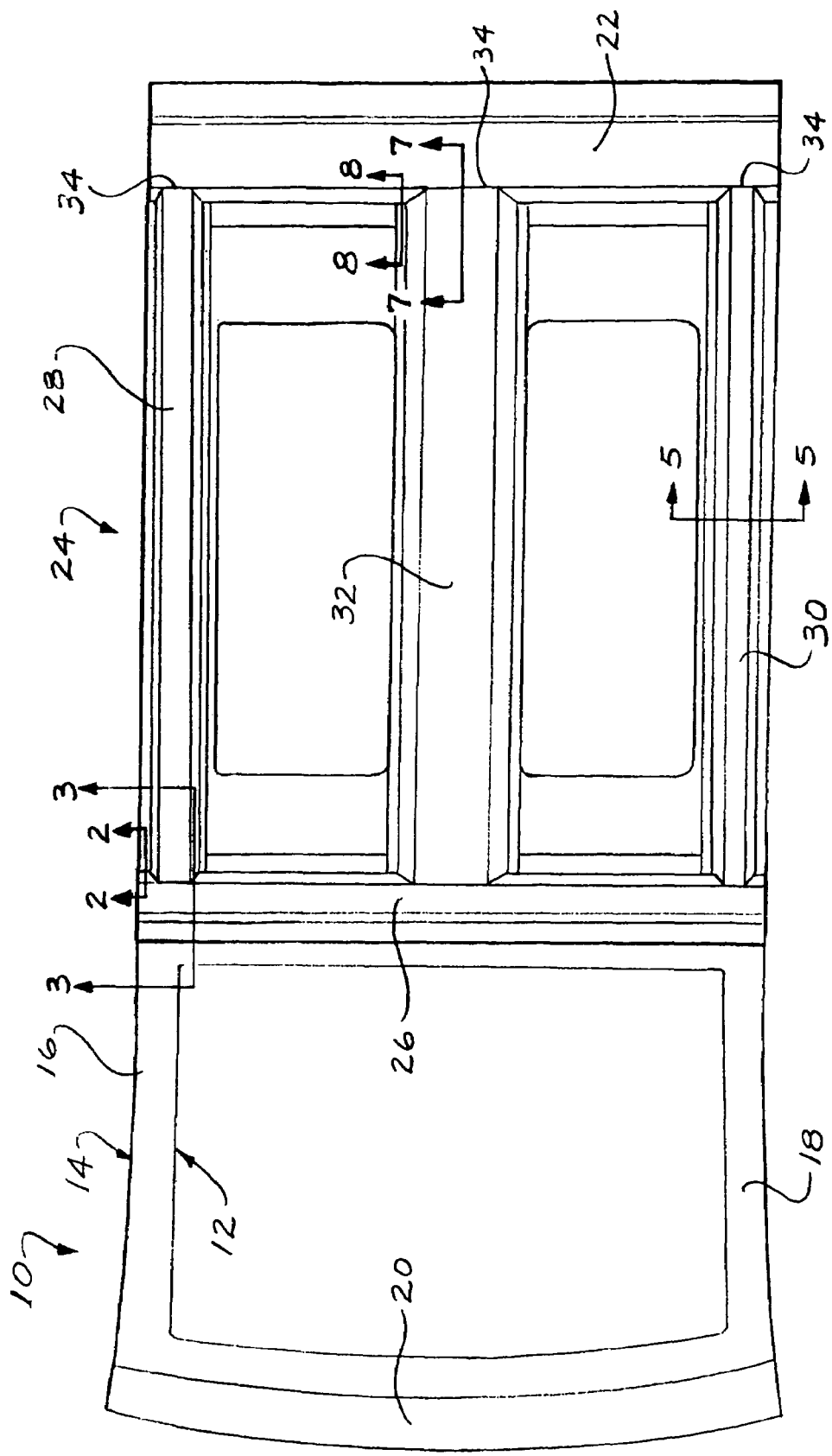
FIG. 1 is a plan view of a roof structure for a vehicle according to one embodiment of the present invention.
Figure 2:
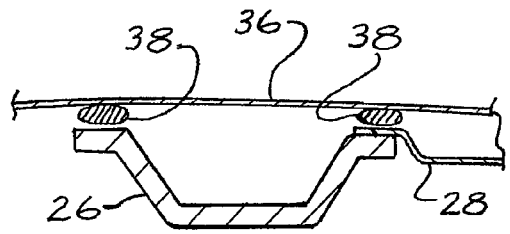
FIG. 2 is a cross sectional view of the inner roof structure according to one embodiment of the present invention taken as shown in FIG. 1.
Figure 3:
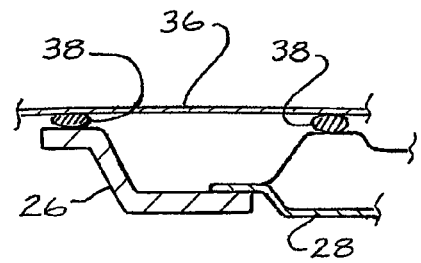
FIG. 3 is a cross sectional view of the inner roof frame according to one embodiment of the present invention taken as shown in FIG. 1.

Referring now to FIG. 1, a roof structure 10 for a roof 12 of a vehicle 14 can extend transversely between two lateral roof elements 16, 18 and can extend in a lengthwise direction between a front roof element 20 and a rear roof element 22. According to one embodiment of the present invention, the roof structure 10 can include a tailor-welded-blank, inner roof frame 24 that can include, at least in part, an elongated, transversely extending, intermediate roof rail 26 having a first material thickness $t_1$ and a plurality of reinforced roof rails 28, 30, 32. Each of the reinforced roof rails 28, 30, 32 can extend away from the intermediate roof rail 26 in a common direction toward a remote end 34 of the inner roof frame 24. Each of the reinforced roof rails 28, 30, 32 can have a different material thickness $t_2$, $t_3$, $t_4$ than the material thickness $t_1$ of intermediate roof rail 26.

The plurality of reinforced roof rails can include a reinforced right hand roof rail 28 connected to the intermediate roof rail 26, a reinforced left hand roof rail 30 connected to the intermediate roof rail 26 at a location spaced from the right hand roof rail 28, and a reinforced center roof rail 32 connected to the intermediate roof rail 26 at a location in between the right hand roof rail 28 and the left hand roof rail 30. At least two of the reinforced roof rails 28, 30, 32 can have different material thicknesses $t_2$, $t_3$, $t_4$ with respect to each other.

An outer vehicle skin 36 as seen in FIGS. 2-3 and 5-8 can be connected to the inner roof frame 24. The outer vehicle skin 36 can be formed, at least in part, of a material permitting light rays to pass through. The outer vehicle skin 36 can be formed, at least in part, of a material selected from a group consisting of a sheet of metal, a sheet of plastic, a tempered sheet of glass, a laminated sheet of glass, and any combination thereof. A mastic seal material 38 as seen in FIGS. 2-3 and 5-8 can be located between at least a portion of the outer vehicle skin 36 and the inner roof frame 24.

Figure 4:
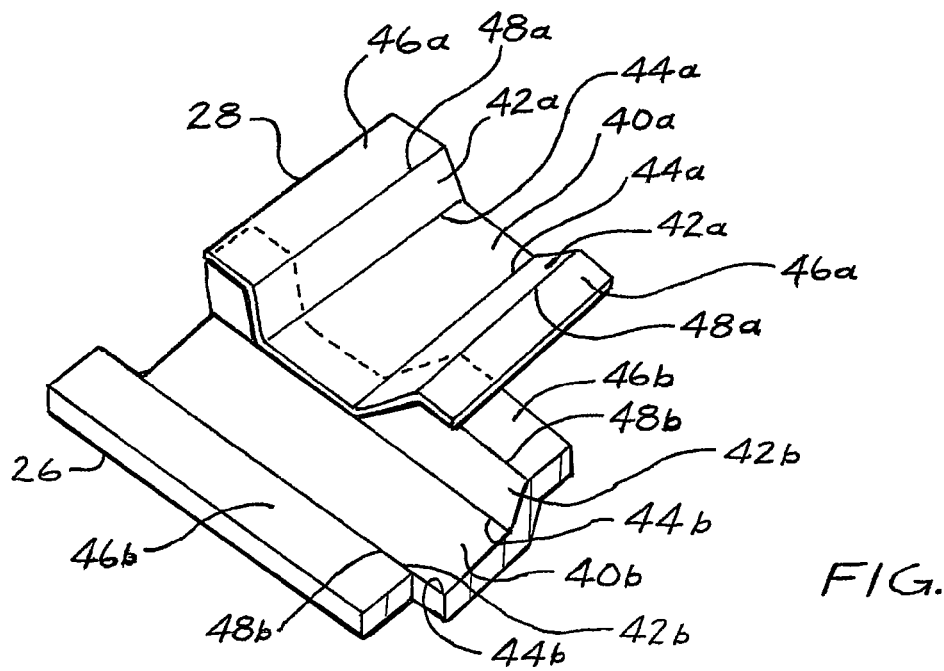
FIG. 4 is a perspective view of the inner roof structure illustrated in FIGS. 2 and 3.
Figure 9:
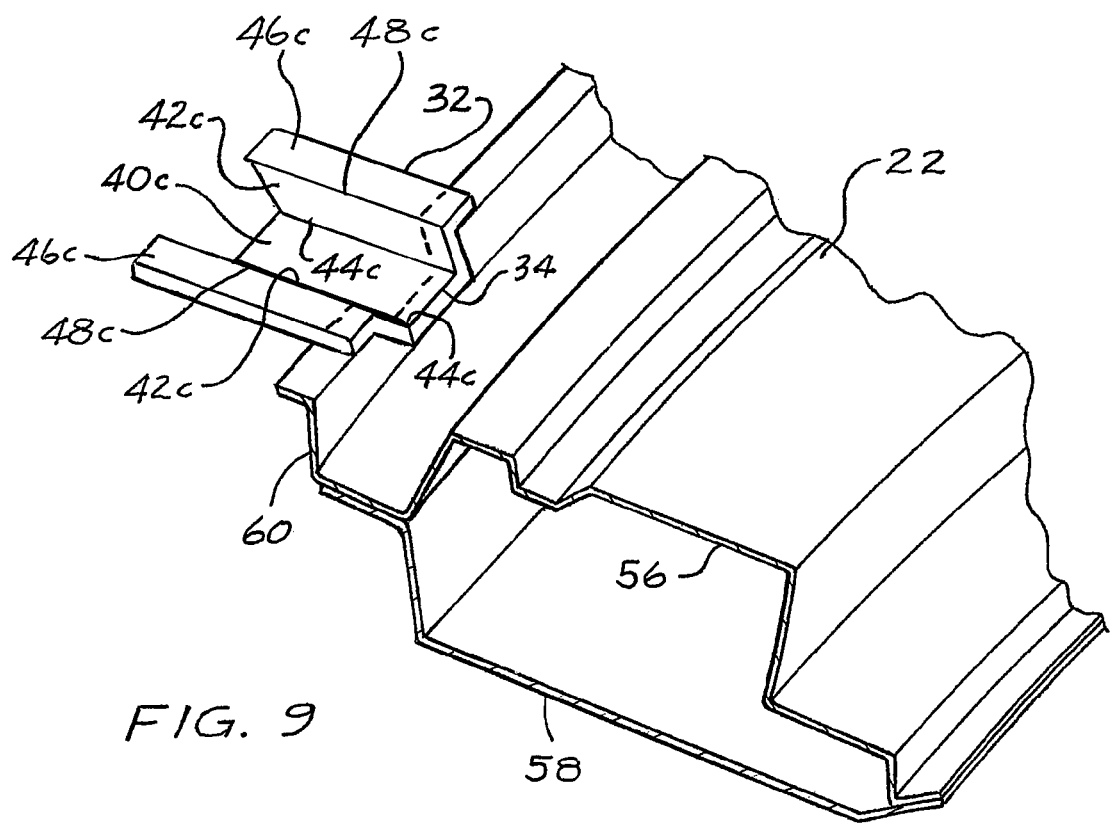
FIG. 9 is a perspective view of the cross sectional area illustrated in FIGS. 7 and 8.

As best seen in FIGS. 4 and 9, each of the reinforced roof rails 28, 30, 32 and the intermediate roof rail 26 have a transverse cross-section defined by a base wall 40a, 40b, 40c, two outwardly angled side walls 42a, 42b, 42c, extending from opposite transverse edges 44a, 44b, 44c of the corresponding base wall 40a, 40b, 40c, and a flange 46a, 46b, 46c extending from an outer end 48a, 48b, 48c of each corresponding side wall 42a, 42b, 42c.

Figure 5:
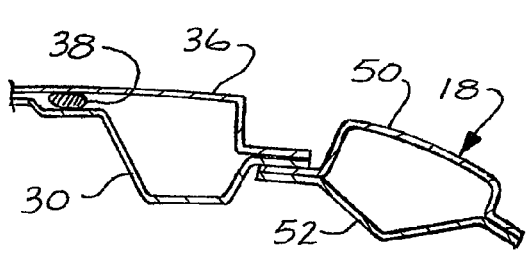
FIG. 5 is a cross sectional view of the inner roof structure according to one embodiment of the present invention taken as shown in FIG. 1.
Figure 6:
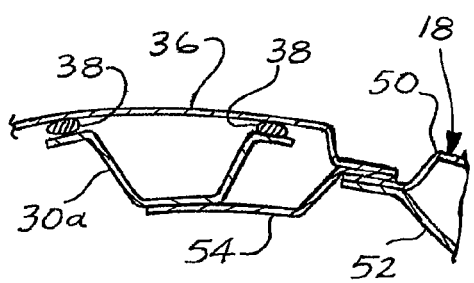
FIG. 6 is an alternative cross sectional view of the inner frame structure according to one embodiment of the present invention in the area corresponding to the cross section of FIG. 5 taken as shown in FIG. 1.

Referring now to FIG. 5, the roof structure according to one embodiment can include at least one lateral roof element 16, 18 connectible to at least one of the plurality of reinforced roof rails 28, 30. Each lateral outer roof element 16, 18 can include a body side outer panel 50 and a side rail outer panel 52 connected to one another. Referring now to an alterative embodiment of the cross-section illustrated in FIG. 6, at least one lateral outer roof element 16, 18 can be connectible to at least one of the plurality of reinforced rails 28, 30, respectively, and a bracket 54 can connect at least one of the plurality of reinforced roof rails 28, 30 to the at least one lateral outer roof element 16, 18, respectively. Each lateral roof element 16, 18 can include a body side outer panel 50 and a side rail outer panel 52 connected to one another.

Figure 7:
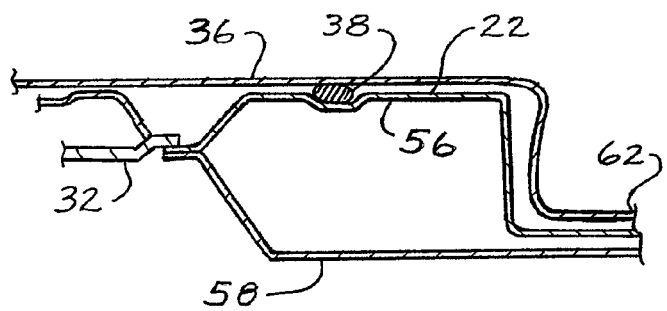
FIG. 7 is a cross sectional view of the inner roof structure according to one embodiment of the present invention taken as shown in FIG. 1.
Figure 8:
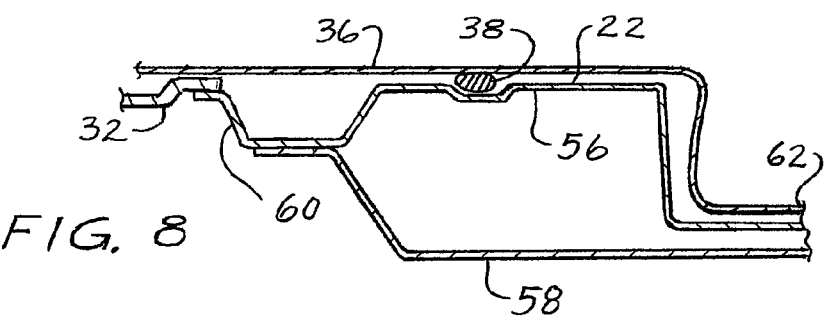
FIG. 8 is a cross sectional view of the inner roof structure according to one embodiment of the present invention taken as shown in FIG. 1.

Referring now to FIGS. 7-9, an elongated, transversely extending, rear roof element 22 can be connected to each remote end 34 of the plurality of reinforced roof rails, 28, 30, 32. The elongated, transversely extending, rear roof element 22 can include an upper panel 56 and a lower panel 58 connected to one another. At least one of the upper and lower panels 56, 58 of the rear roof element 22 can be connected to each of the plurality of reinforced roof rails 28, 30, 32. At least one flange 60 can extend inboard from the rear roof element 22 to support an outer vehicle skin 36 that can be formed, at least in part, of a material permitting light rays to pass through. The outer vehicle skin 36 can be supported by the at least one flange 60 at a point inboard of an edge 62 of the outer vehicle skin 36.

A tailor-welded-blank, inner roof frame 24 according to an embodiment of the present invention can allow different steel materials and/or thicknesses to be selected or "tailored" so that the desired properties are located precisely within a part where needed. The tailor-welded-blank, inner roof frame 24 can provide one or more benefits including fewer parts, fewer dies, fewer spot welds, lowered manufacturing costs, reduced material use, optimization of steel properties, weight reduction, improved dimensional accuracy, improved structural integrity, and/or improved safety. The tailor-welded-blank, inner roof frame can be made from sheet steels having different material thicknesses, special coatings, and/or different material properties. The tailor-welded-blank, inner roof frame can be assembled with any known type of welding process, by way of example and not limitation, such as laser beam, butt-welding, resistance mash seam lap welding, high frequency induction welding, electron beam welding, laser welding with fixed optics, laser welding with moving optics, laser welding with filler wire, and laser beam weaving, or any combination thereof.

The tailor-welded-blank, inner roof frame 24 can include four main structural components, namely intermediate roof rail 26, right hand reinforced roof rail 28, left hand reinforced roof rail 30, and center reinforced roof rail 32 to provide the proper roof support for an outer vehicle skin 36 formed, at least in part, of a material permitting light rays to pass through. The tailor-welded-blank, inner roof frame 24 allows integration of different parts with different material thicknesses and/or different material properties to form an inner roof frame. Each member can serve a different function that can require a specific material thickness and/or a specific material property. The intermediate roof rail 26 can serve as a center cross-member to transfer load during side impact and can also serve as a vertical load bearing beam to help support a front, top load, sunroof unit, if desired. The intermediate roof rail 26 can also be used as a rigid member to mount a second row video screen to eliminate the problem of a video screen shake. The plurality of reinforced roof rails 28, 30, 32 can act as beams to support the vertical loads of any suitable outer vehicle skin 36, by way of example and not limitation, such as transparent or opaque roof panels and/or shade systems that can mount directly to the roof panels, if desired. The inner roof frame 24 can serve the same purpose as a roof bow to provide panel stiffness. The inner roof frame 24 can be welded together using any suitable welding technique, by way of example and not limitation, such as spot welding or laser welding, to allow for different material thicknesses and/or material properties between the intermediate roof rail 26 and the plurality of reinforced roof rails 28, 30, 32. The plurality of reinforced roof rails 28, 30, 32 can be made from one stamping rather than three separate stampings. The inner roof frame 24 can be formed of components that serve different functions and allows for optimized cost and weight due to different material thicknesses and/or material properties. The inner roof frame 24 can be assembled to the vehicle main body prior to applying mastic 38 and adding the roof panel or outer vehicle skin 36 to be welded; or alternatively, the inner roof frame 24 can be assembled to a roof panel or outer vehicle skin 36, prior to the inner roof frame 24 and assembled roof panel 36 being added to the vehicle main body and welded in place.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A roof structure for a vehicle comprising:
    a tailor-welded-blank, inner roof frame comprising, at least in part:
        an elongated, transversely extending, intermediate roof rail having a first material thickness; and
        a plurality of reinforced roof rails, each of the reinforced roof rails extending away from the intermediate roof rail in a common direction toward a remote end of the inner roof frame, each of the reinforced roof rails having a different material thickness than the intermediate roof rail,
    wherein the plurality of reinforced roof rails are spaced apart and define at least one gap extending fully between the intermediate roof rail and the remote end of the inner roof frame.

2. The roof structure of claim 1, wherein the plurality of reinforced roof rails further comprises:
    a reinforced right hand roof rail connected to the intermediate roof rail;
    a reinforced left hand roof rail connected to the intermediate roof rail at a location spaced from the right hand roof rail; and
    a reinforced center roof rail connected to the intermediate roof rail at a location in between the right hand roof rail and the left hand roof rail, wherein at least two of the reinforced roof rails have different material thicknesses with respect to each other.

3. The roof structure of claim 1 further comprising:
    an outer vehicle skin connected to the inner roof frame.

4. The roof structure of claim 3, wherein the outer vehicle skin is formed, at least in part, of a material permitting light rays to pass through.

5. The roof structure of claim 3, wherein the outer vehicle skin is formed, at least in part, of a material selected from a group consisting of a sheet of metal, a sheet of plastic, a tempered sheet of glass, a laminated sheet of glass, and any combination thereof.

6. The roof structure of claim 3 further comprising:
    a mastic seal material located between at least a portion of the outer vehicle skin and the inner roof frame.

7. The roof structure of claim 1, wherein each of the reinforced roof rails has a transverse cross section defined by a base wall, two outwardly angled side walls extending from opposite transverse edges of the base wall, and a flange extending from an outer end of each side wall;
    wherein the intermediate roof rail has a longitudinal cross section at least partially defined by a base wall, an outwardly angled side wall extending from a longitudinal edge of the base wall, and a flange extending from an outer end of the side wall; and
    wherein the side wall and flange of the intermediate roof rail define a plurality of indentations conforming in shape to the respective base walls and side walls of the reinforced roof rails.

8. The roof structure of claim 1 further comprising:
    at least one lateral outer roof element; and
    a bracket connecting at least one of the plurality of reinforced roof rails to the at least one lateral outer roof element.

9. The roof structure of claim 8, wherein each lateral outer roof element includes a body side outer panel and a side rail outer panel connected to one another.

10. The roof structure of claim 7 further comprising:
    an elongated, transversely extending, rear roof element connected to each remote end of the reinforced roof rails;
    wherein the rear roof element defines a plurality of indentations conforming in shape to the respective base walls and side walls of the reinforced roof rails.

11. The roof structure of claim 10 further comprising:
    at least one flange extending inboard from the rear roof element to support an outer vehicle skin formed, at least in part, of a material permitting light rays to pass through, the outer vehicle skin supported by the at least one flange at a point inboard of an edge of the outer vehicle skin.

12. The roof structure roof claim 1 further comprising:
    an elongated, transversely extending, rear roof element including an upper panel and a lower panel connected to one another; and
    at least one of the upper and lower panels of the rear roof element connected to each of the plurality of reinforced roof rails.

13. A roof structure for a vehicle comprising:
    a tailor-welded-blank, inner roof frame comprising, at least in part:
        an elongated, transversely extending, intermediate roof rail having a first material thickness; and
        a plurality of reinforced roof rails, each of the reinforced roof rails extending away from the intermediate roof rail in a common direction toward a remote end of the inner roof frame, each of the reinforced roof rails having a different material thickness than the intermediate roof rail,
    wherein each of the reinforced roof rails has a transverse cross section defined by a base wall, two outwardly angled side walls extending from opposite transverse edges of the base wall, and a flange extending from an outer end of each side wall;
    wherein the intermediate roof rail has a longitudinal cross section at least partially defined by a base wall, an outwardly angled side wall extending from a longitudinal edge of the base wall, and a flange extending from an outer end of the side wall; and
    wherein the side wall and flange of the intermediate roof rail define a plurality of indentations conforming in shape to the respective base walls and side walls of the reinforced roof rails; and
    at least one lateral outer roof element connected to one of the flanges of at least one of the plurality of reinforced roof rails.

14. The roof structure of claim 13, wherein each lateral outer roof element includes a body side outer panel and a side rail outer panel connected to one another at a junction, and wherein the junction is connected to the one of the flanges of the at least one of the plurality of reinforced roof rails.

15. A roof structure for a roof of a vehicle extending transversely between two lateral outer roof elements and extending in a lengthwise direction between a front roof element and a rear roof element, the roof structure comprising:
a tailor-welded-blank, inner roof frame connectible between the lateral roof elements and to the rear roof element comprising, at least in part:
an elongated, transversely extending, intermediate roof rail located between the front roof element and the rear roof element and having a first material thickness; and
a plurality of the reinforced roof rails, each of the reinforced roof rails connected to the intermediate roof rail and extending away from the intermediate roof rail in a common direction toward the rear roof element, each of the reinforced roof rails having a different material thickness than the intermediate roof rail
wherein the intermediate roof rail defines a plurality of indentations conforming in shape to respective shapes of the plurality of reinforced roof rails; and
an outer vehicle skin connected to the inner roof frame,
wherein the plurality of reinforced roof rails are spaced apart and define at least one gap extending fully between the intermediate roof rail and the rear roof element.

16. The roof structure of claim 15, wherein the plurality of reinforced roof rails further comprises:
a reinforced right hand roof rail connected to the intermediate roof rail;
a reinforced left hand roof rail connected to the intermediate roof rail at a location spaced from the right hand roof rail; and
a reinforced center roof rail connected to the intermediate roof rail at a location in between the right hand roof rail and the left hand roof rail, wherein at least two of the reinforced roof rails have different material thicknesses with respect to each other.

17. The roof structure of 15, wherein the outer vehicle skin is formed, at least in part, of a material permitting light rays to pass through.

18. The roof structure of claim 15, wherein the outer vehicle skin is formed, at least in part, of a material selected from a group consisting of a sheet of metal, a sheet of plastic, a tempered sheet of glass, a laminated sheet of glass, and any combination thereof.

19. The roof structure of claim 15 further comprising:
each remote end of the reinforced roof rails connected to the rear roof element at indentations defined by the rear roof element shaped in conformity with the shapes of the respective roof rails.

20. The roof structure of claim 15, wherein each of the reinforced roof rails has a transverse cross section defined by a base wall, two outwardly angled side walls extending from opposite transverse edges of the base wall, and a flange extending from an outer end of each side wall; and
wherein the plurality of indentations defined by the intermediate roof rail conform in shape to the respective base walls and side walls of the reinforced roof rails.

21. The roof structure of claim 15 further comprising:
a bracket connecting at least one of the plurality of reinforced roof rails to at least one of the two lateral outer roof elements of the vehicle.

22. The roof structure of claim 21, wherein the two lateral outer roof elements each include a body side outer panel and a side rail outer panel connected to one another.

23. The roof structure of claim 20 further comprising:
one of the flanges of one of the plurality of reinforced roof rails connected to at least one of the two lateral outer roof elements of the vehicle.

24. The roof structure of claim 23, wherein the two lateral outer roof elements each include a body side outer panel and a side rail outer panel connected to one another at a junction, and wherein the junction is connected to the one of the flanges of the one of the plurality of reinforced roof rails.

25. The roof structure of claim 15 further comprising:
at least one flange extending inboard from the rear roof element to support an outer vehicle skin formed, at least in part, of a material permitting light rays to pass through, the outer vehicle skin supported by the at least one flange at a point inboard of an edge of the outer vehicle skin.

* * * * *